United States Patent
Komiya

(10) Patent No.: US 7,132,602 B1
(45) Date of Patent: Nov. 7, 2006

(54) CABLE OR THE LIKE CLAMP MEMBER FOR CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/357,484

(22) Filed: Feb. 18, 2006

(30) Foreign Application Priority Data

Apr. 22, 2005 (JP) .............................. 2005-125615

(51) Int. Cl.
H02G 15/02 (2006.01)
(52) U.S. Cl. ............... 174/70 R; 174/71 R; 174/72 R; 174/74 R
(58) Field of Classification Search ............... 174/68.1, 174/69, 36, 99 E, 136, 117 F, 117 FF, DIG. 9, 174/70 R, 70 C, 71 R, 72 R, 72 A, 72 TR; 59/78, 78.1; 191/12 C, 12 R; 248/51, 59
See application file for complete search history.

(56) References Cited

U.S. PATENT DOCUMENTS

| | | | | |
|---|---|---|---|---|
| 3,630,325 A | * | 12/1971 | Corl et al. ................. | 191/12 C |
| 3,779,003 A | * | 12/1973 | Boissevain et al. .......... | 59/78.1 |
| 4,898,351 A | * | 2/1990 | Suzuki ......................... | 248/51 |
| 5,230,420 A | * | 7/1993 | Meier et al. ............. | 198/750.1 |
| 5,669,749 A | * | 9/1997 | Danielson et al. .......... | 414/280 |
| 6,215,068 B1 | * | 4/2001 | Meier ......................... | 174/68.1 |
| 6,916,062 B1 | * | 7/2005 | Suzuki et al. ................ | 296/155 |

FOREIGN PATENT DOCUMENTS

WO    WO 98/21503    5/1998

* cited by examiner

Primary Examiner—William H. Mayo, III
(74) Attorney, Agent, or Firm—Woodling, Krost and Rust

(57) ABSTRACT

The present invention provides a cable or the like clamp member 120 to guide and protect a flexible cable or the like. The cable or like guide and protection is flexible and the clamp member 120 is adaptable to adjust to the thicknesses, number, and layout of cables to be clamped. The cable or the like clamp member 120 is attached to at least one of a fixed end part to be mounted on a stationary side and a moving end part to be mounted on a moving side of a cable or the like protection and guide device for storing and protectively guiding cables C. The cable or the like clamp member 120 comprises a comb-tooth unit member 122 for clamping the cables; and a comb-tooth unit receiving member 121 with comb-tooth installation slide mechanisms 121b for slidably engaging and installing the comb-tooth unit member according to the bending state of the cables.

2 Claims, 6 Drawing Sheets

CABLE OR THE LIKE CLAMP MEMBER FOR CABLE OR THE LIKE PROTECTION AND GUIDE DEVICE

This patent application claims priority to Japanese Patent Application 2005-125615 filed Apr. 22, 2005.

TECHNICAL FIELD

The present invention relates to a cable or the like protection and guide device suitable for safely and surely protecting and guiding cables such as electric cables for transmitting electric signal or supplying electric power or hoses for supplying oil pressure or air pressure, which connect a moving part to a stationary part, for example, in an industrial machine, a semiconductor chip mounter, a vehicle or the like even during movement of the moving part as well as storing the cables and, more specifically, relates to a cable or the like clamp member used to clamp (fix) cables at a moving end part and a fixed end part of the cable or the like protection and guide device.

BACKGROUND ART

Conventionally, as this kind of cable or the like clamp member for cable or the like protection and guide device, a mounting unit provided at the moving end part or the fixed end part located at an end of the cable or the like protection and guide device is known (for example, refer to Patent Document 1).

In general, if a cable is protectively guided by the cable or the like protection and guide device without clamping both ends of the stored cable to the ends of the cable or the like protection and guide device, slippage in motion is caused between the stored cable and the device, for example, when the device is moved in accordance with a moving part of an industrial machine, and the stored cable may be rubbed with the cable or the like protection and guide device or with another stored cable within a cable storage space and damaged by sliding wear or the like.

Therefore, measures have been taken in the past to use a cable or the like clamp member such as the mounting unit disclosed in the above-mentioned document to clamp the stored cable to the cable protective device at both ends thereof, thereby suppressing the slippage in motion between the stored cable and the cable protective device in the movement of the device as much as possible to prevent the damage of the stored cable.

Patent Document 1 is Japanese Patent Publication No. 2001-504199.

PROBLEMS TO BE SOLVED BY THE INVENTION

However, in a usage form of the related art in which stored cables C are divided into two stages of bending inner circumferential side and bending outer circumferential side in a cable storage space SP of a device body 11, as shown in FIG. 6, and the respective cables C (C1, C2) stored on both the bending inner circumferential side and on the bending outer circumferential side are clamped to a cable or the like protection and guide device 10 at both a moving end part 12 and a fixed end part 13, respectively, the following problem was pointed out.

For example, the transition of the cable or the like protection and guide device 10 from a linear state to a bent state according to the moving posture between a moving part MA and a stationary part MB of an industrial machine will be outlined.

When the cable or the like protection and guide device 10 is in the linear state, the lengths of both the cable C1 located on the bending inner circumferential side and the cable C2 located on the bending outer circumferential side are equal to the length of the center line of the device body 11. If the cable protective device 10 is bent while clamping the cables C1 and C2 to the moving end part 12 and the fixed end part 13 of the device body 11 in this state, the cable C1 located on the bending inner circumferential side is loosened with a surplus length in the device body 11 because it is located on the inner side from the central line, and unreasonable force is applied to the clamp members.

On the other hand, the cable C2 located on the bending outer circumferential side is tensed with an insufficient length in the device body 11 because it is located on the outer side from the central line of the device body 11, and unreasonable force is applied to the clamp members.

Repeat of such a transiting motion of the cable protective device 10 from the linear state to the bent state causes breakage of the clamp members, or wear or disconnection of the cables C.

Although the problem in the storage of two stages of the bending inner circumferential side and the bending outer circumferential side was described above, the same problem as in the two-stage storage form occurs according to the moving posture between the moving part MA and the stationary part MB of the industrial machine even in a one-stage storage form such that stored cables are clamped to either the bending inner circumferential side or the bending outer circumferential side at both the moving end part and the fixed end part.

The conventional mounting unit had low flexibility because the thickness, number and layout of cables to be clamped are preliminarily fixed.

The present invention thus has been made to solve the above-mentioned problem, and provides a flexible cable or the like clamp member capable of preventing application of unreasonable force to stored cables by bending operation of a cable or the like protection and guide device, and flexibly responding to the thickness, number, and layout of cables to be clamped.

MEANS FOR SOLVING THE PROBLEMS

The present invention involves a cable or the like clamp member to be attached to at least either of a fixed end part to be mounted on a stationary side and a moving end part to be mounted on a moving side of a cable or the like protection and guide device for storing and protectively guiding cables, the cable or the like clamp member comprising a comb-tooth unit member for clamping the cables and a comb-tooth unit receiving member with comb-tooth installation slide mechanism for slidably engaging and installing the comb-tooth unit member according to the bending state of the cables.

EFFECT OF THE INVENTION

According to the first embodiment of the present invention, since the cable or the like clamp member to be attached to at least either of a fixed end part to be mounted on a stationary side and a moving end part to be mounted on a moving side of a cable or the like protection and guide device for storing and protectively guiding cables comprises the comb-tooth unit member for clamping the cables and the comb-tooth unit receiving member with comb-tooth installation slide mechanism for slidably engaging and installing the comb-tooth unit members according to the bending state of the cables, the application of unreasonable force to the stored cables by bending operation of the cable or the like protection and guide device can be prevented. Further, this cable or the like clamp member can respond to various thicknesses of cables only by changing the comb-tooth unit member, and also to layout change of cables only by changing the position for engaging and installing the comb-tooth unit member, and a flexible cable or the like clamp member can be obtained.

In the prevent invention, the cable or the like clamp member to be attached to at least either of a fixed end part to be mounted on a stationary side and a moving end part to be mounted on a moving side of a cable or the like protection and guide device for storing and protectively guiding cables comprises a comb-tooth unit member for clamping the cables and a comb-tooth unit receiving member with comb-tooth installation slide mechanism for slidably engaging and installing the comb-tooth unit members according to the bending state of the cables, whereby the cable or the like clamp member can prevent application of unreasonable force to stored cables by bending operation of the cable or the like protection and guide device, and respond to various thickness of cables only by changing the comb-tooth unit member and to layout change of cables only by changing the position for engagingly installing the comb-tooth unit member. The cable or the like clamp member can have any concrete form if it has high flexibility capable of changing the layout of cables as described above.

The cable or the like protection and guide device referred to in the present invention means a cable or the like protection and guide device suitable for safely and surely protecting and guiding cables such as electric cables for transmitting electric signals or supplying electric power, or hoses for supplying oil pressure or air pressure, which connect a moving part to a stationary part in an industrial machine, a semiconductor chip mounter, a vehicle or the like even during movement of the moving part as well as storing the cables.

Concretely, the structure of a main body of the cable or the like protection and guide device can be formed by connecting a number of rectangular link frame bodies, each of which comprises a pair of right and left link plates, and a bending inner circumferential-side connecting plate and a bending outer circumferential-side connecting plate connected with both the link plates on the bending inner circumferential side and at the bending outer circumferential side, respectively, long through connecting pins or the like, or composed of a lengthy surrounding body bendably formed in an integrated manner.

These and other effects of the invention will be understood when reference is made to the Brief Description of the Drawings, Description of the Invention and Claims which follow hereinbelow.

The drawings will be better understood when reference is made to the Description of the Invention and Claims which follow hereinbelow.

DESCRIPTION OF THE INVENTION

Example

An example of the cable or the like clamp member for cable or the like protection and guide device of the present invention will be described as a preferred embodiment with reference to the accompanying drawings.

Figure 1:
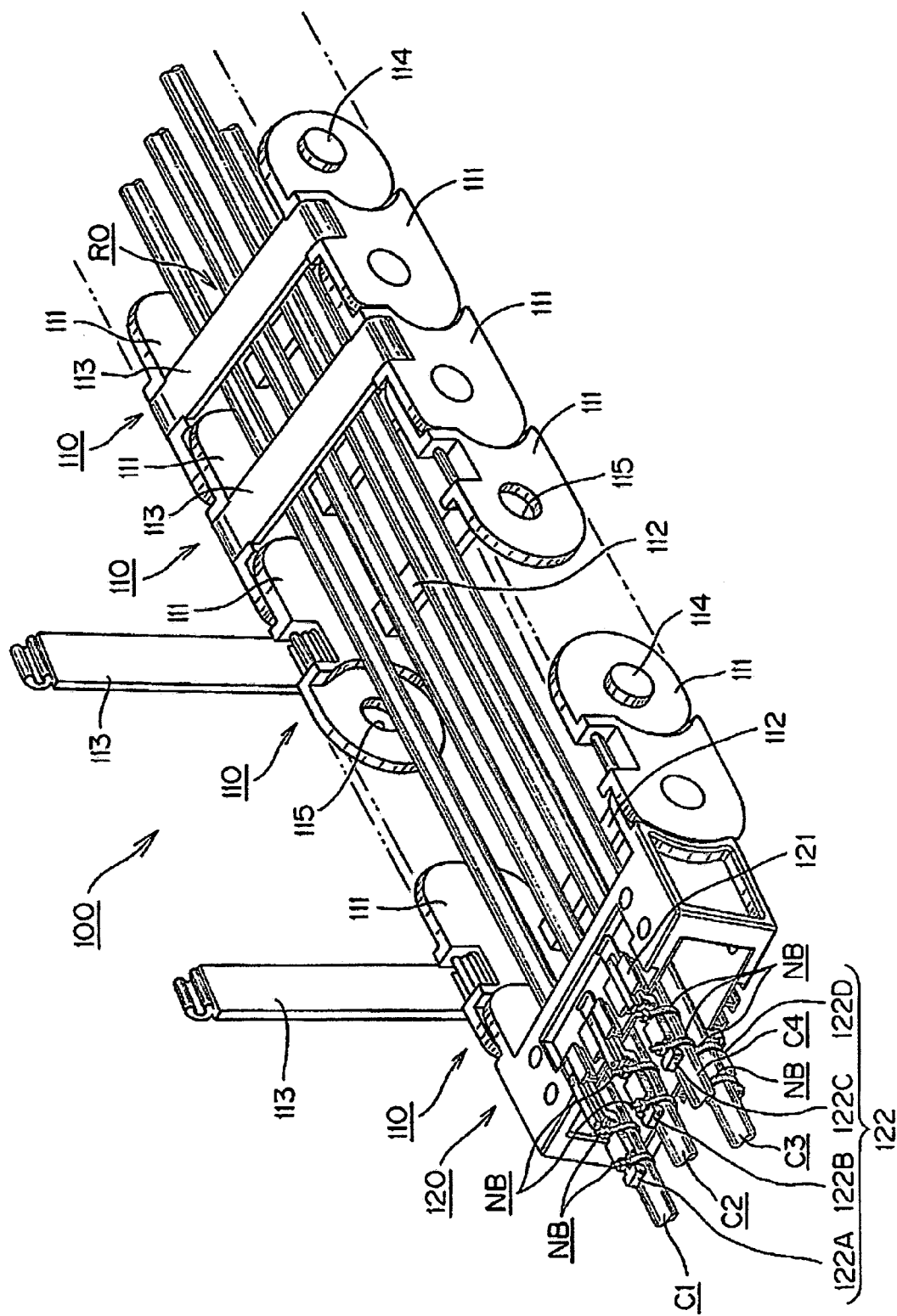
FIG. 1 is a perspective view of a cable or the like protection and guide device to which the present invention is applied.

The example of the cable or the like clamp member according to the present invention is described using FIGS. 1 to 5. FIG. 1 is a perspective view of a cable or the like protection and guide device 100 to which the cable or the like clamp member of the present invention is applied. As shown in FIG. 1, the cable or the like protection and guide device 100 of the present invention, which is used, for example, to protectively guide cables C (C1, C2, C3, C4) such as cables or hoses for supplying energy such as electric power or compressed air from a stationary part of an industrial machine (e.g., a semiconductor chip mounter, a machine tool, etc.) to a moving part of the machine, is formed by mutually connecting a number of rectangular link frame bodies 110 long, for example, so that it can present a linear state or a bent state according the moving behavior between the moving part and the stationary part of the industrial machine not shown, and protectively guide the cables C (C1, C2, C3, C4) in a cable storage space SP continuously formed by the link frame bodies 110 in a state where they are inserted therethrough.

The link frame body 110 is molded of, for example, a glass fiber-reinforced polyamide-based resin which can exhibit an excellent strength characteristic, in which a pair of right and left link plates 111, 111 arranged with a space are integrated with a bending inner circumferential-side connecting plate 112 and a bending outer circumferential-side connecting plate 113 laterally laid on the bending inner circumferential side and the bending outer circumferential side of the link plates 111, 111, respectively, in a rectangular shape.

The bending inner circumferential-side connecting plate 112 is integrated with the pair of right and left link plates 111, 111 by injection molding, while one end of the bending outer circumferential-side connecting plate 113 is rotatably connected to one of the link plates 111, and the other end is openable and closable to be engageable with the other link plate 111.

The link plate 111 has a so-called offset structure forming a step in the plate thickness direction between the forward side and backward side of the plate, and the link plate 111 further has a connecting pin 114 on the backward side and a connecting pin hole 115 with substantially the same diameter as the connecting pin 114 on the forward side.

Therefore, the link frame bodies 110 are mutually connected by mutually fitting the connecting pin 114 and connecting pin hole 115 of the continuously arranged link plates 111, 111 so as to be bendable within a regulated angle range about the connecting pin 114.

Figure 2:
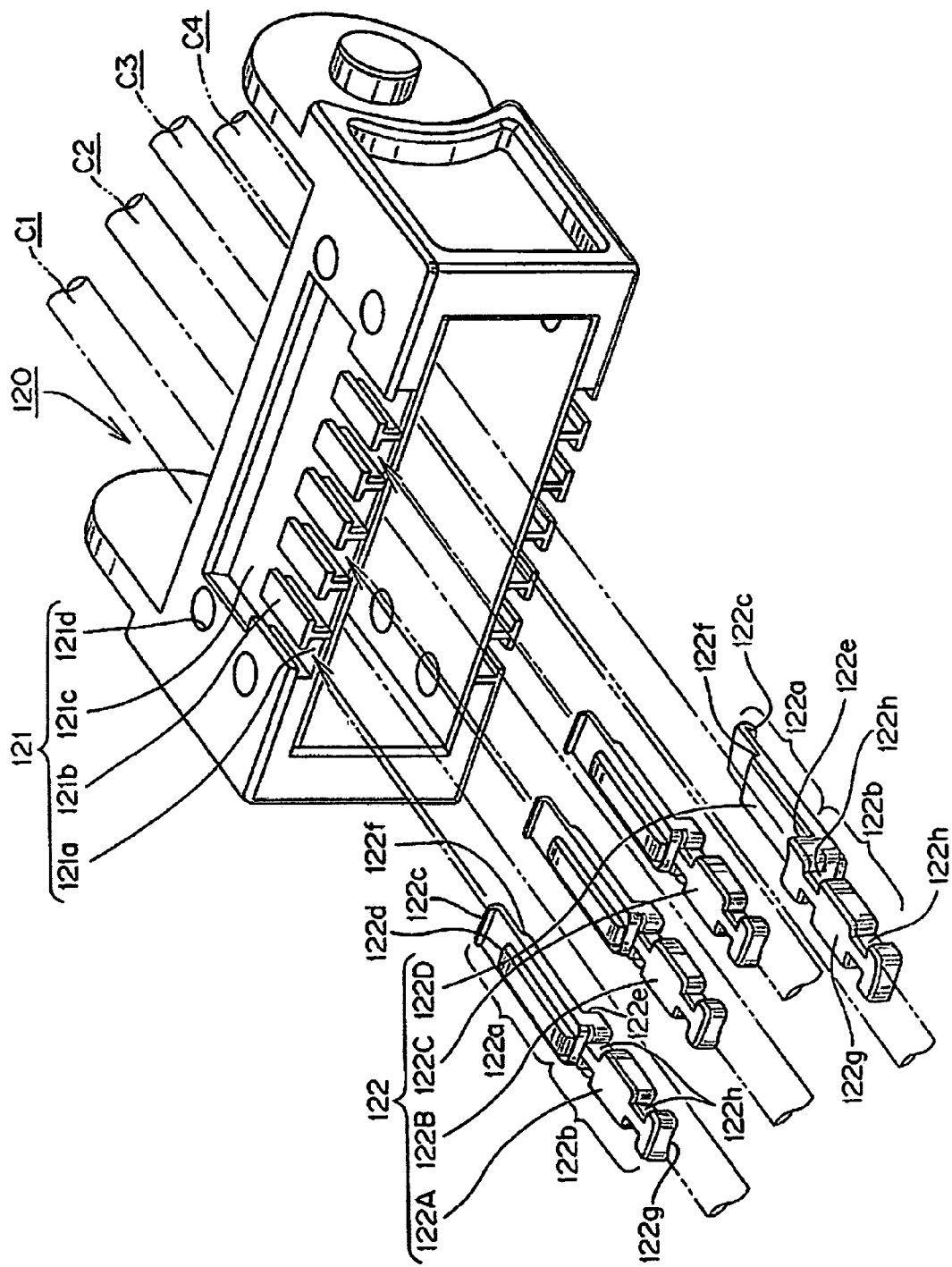
FIG. 2 is a perspective view illustrating the half-assembled state of a cable or the like clamp member of the present invention.
Figure 3:
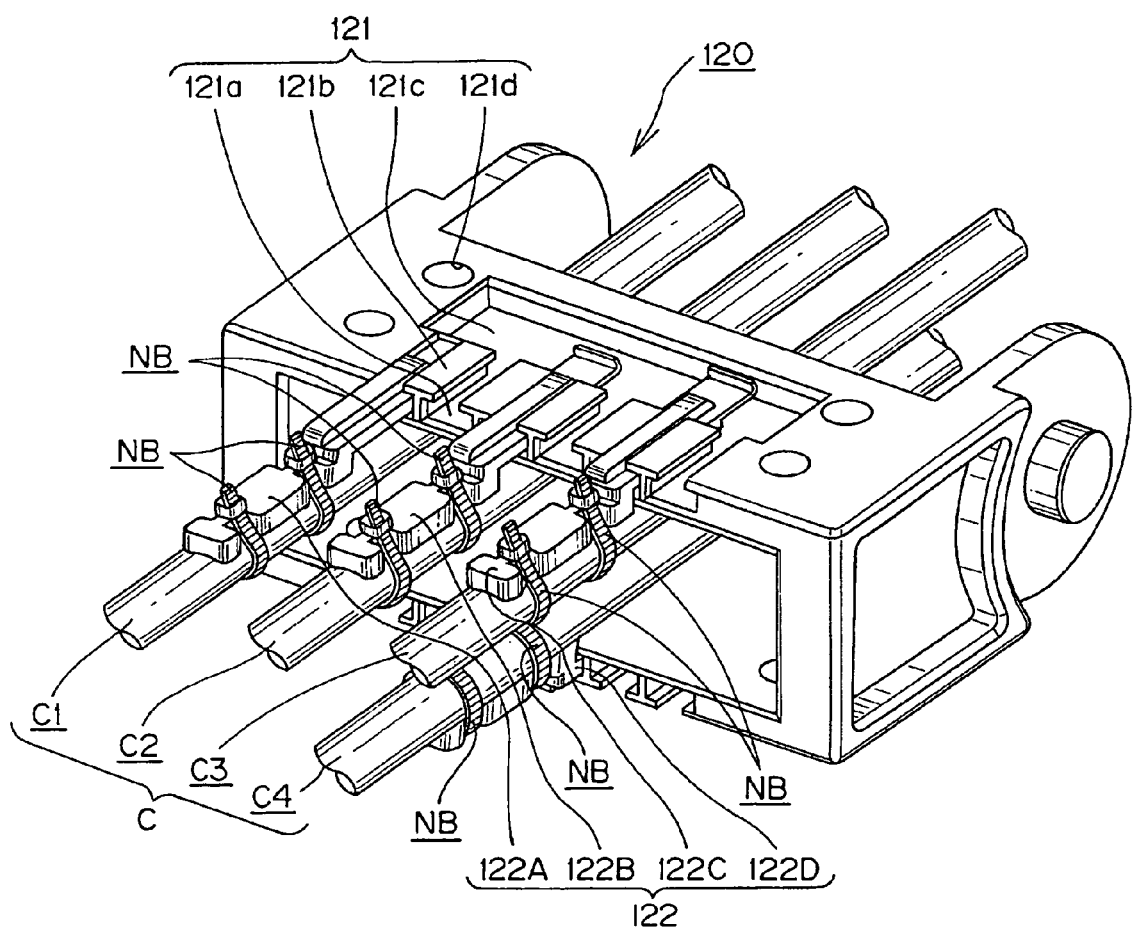
FIG. 3 is a perspective view illustrating the assembling completed state of the cable or the like clamp member of the present invention.

In this example, as shown in FIGS. 2 and 3, a cable or the like clamp member 120 is installed and which comprises a comb-tooth unit receiving member 121 to be set at a moving end part of the cable or the like protection and guide device 100 or at a fixed end part not shown thereof, and a comb-tooth unit member 122 to be slidably engaged with and installed to T-shaped sectional comb-tooth installation slide mechanisms 121b arranged in a width direction on the comb-tooth unit receiving member 121. The width direction referred to herein means the lateral direction connecting the pair of right and left link plates to each other.

Figure 4:
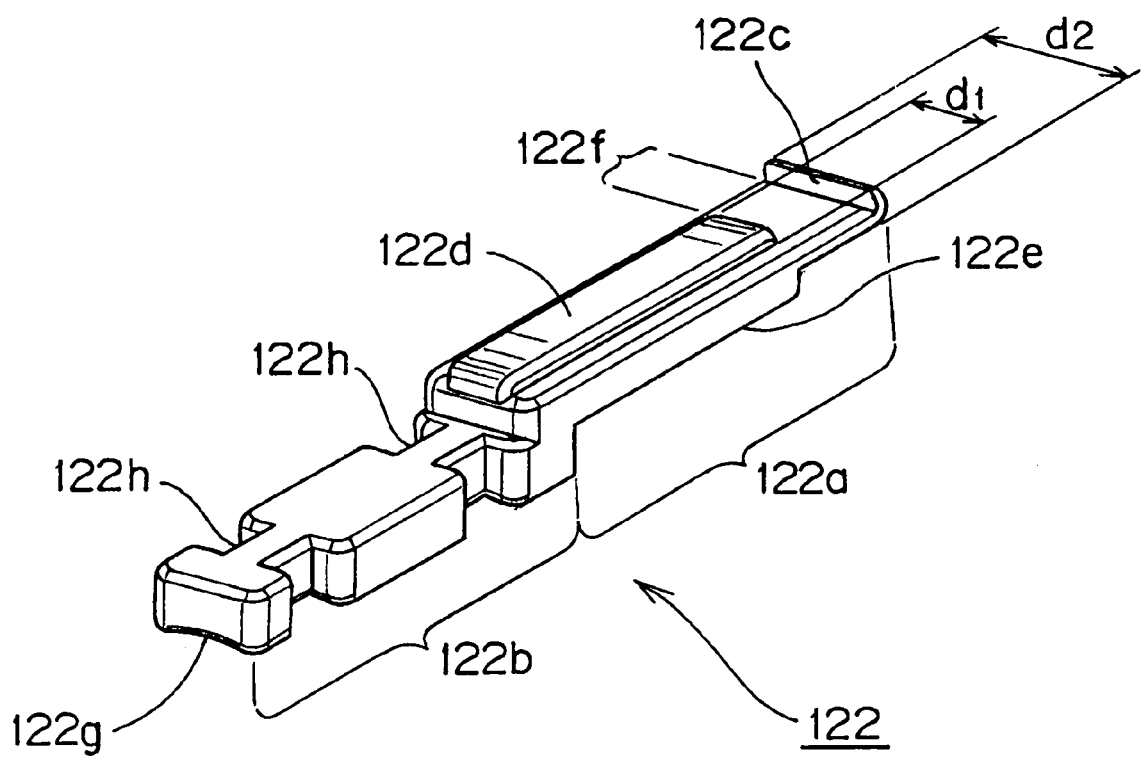
FIG. 4 is a perspective view of a comb-tooth unit member of the present invention.

Each comb-tooth unit member 122 (122A, 122B, 122C, 122D) has a comb-tooth unit engagement part 122a to be slidably engaged with and installed to the comb-tooth installation slide mechanisms 121b, as described in FIG. 4 in detail, and a cable mounting part 122b having a cable receiving curved face 112g to abut on the cable C. The cable mounting part 122b has band fixing grooves 122h for preventing lateral slippage of bands NB formed of, for example, Nylon (trademark) in two positions. Further, the engagement part 122a has an engagement protruding portion 122d having a width d1 engaged with the T-shaped upper edge gap between the T-shaped sectional members of the adjacent comb-tooth installation slide mechanisms 121b. The width d2 of the engagement part 122a is set to a width engaged between the vertical parts of the adjacent T-shaped sectional members. A slide surface 122e is formed on the opposite side to the engagement protruding portion 122d of the engagement part 122a, and this surface makes slide contact with an engaged portion 121a formed between the adjacent comb-tooth installation slide mechanisms 121b.

Figure 5:
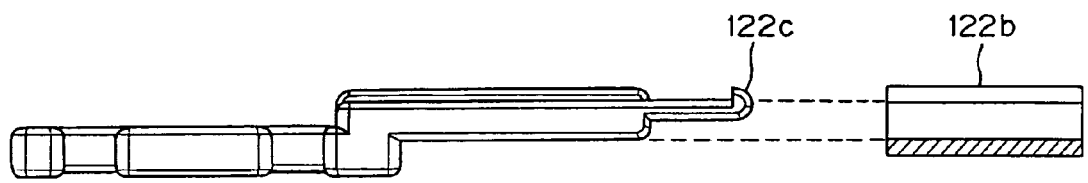
FIGS. 5(a), (b) and (c) are side views illustrating the engagement state of the comb-tooth unit member of the present invention.
Figure 5:
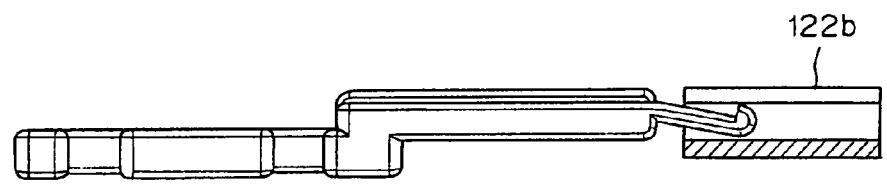
Figure 5:
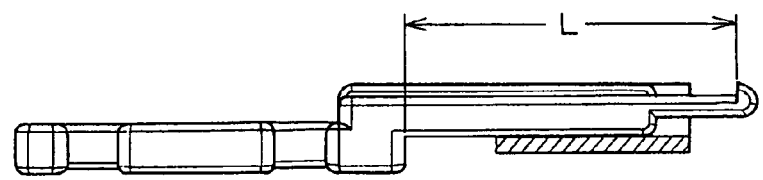
Figure 6:
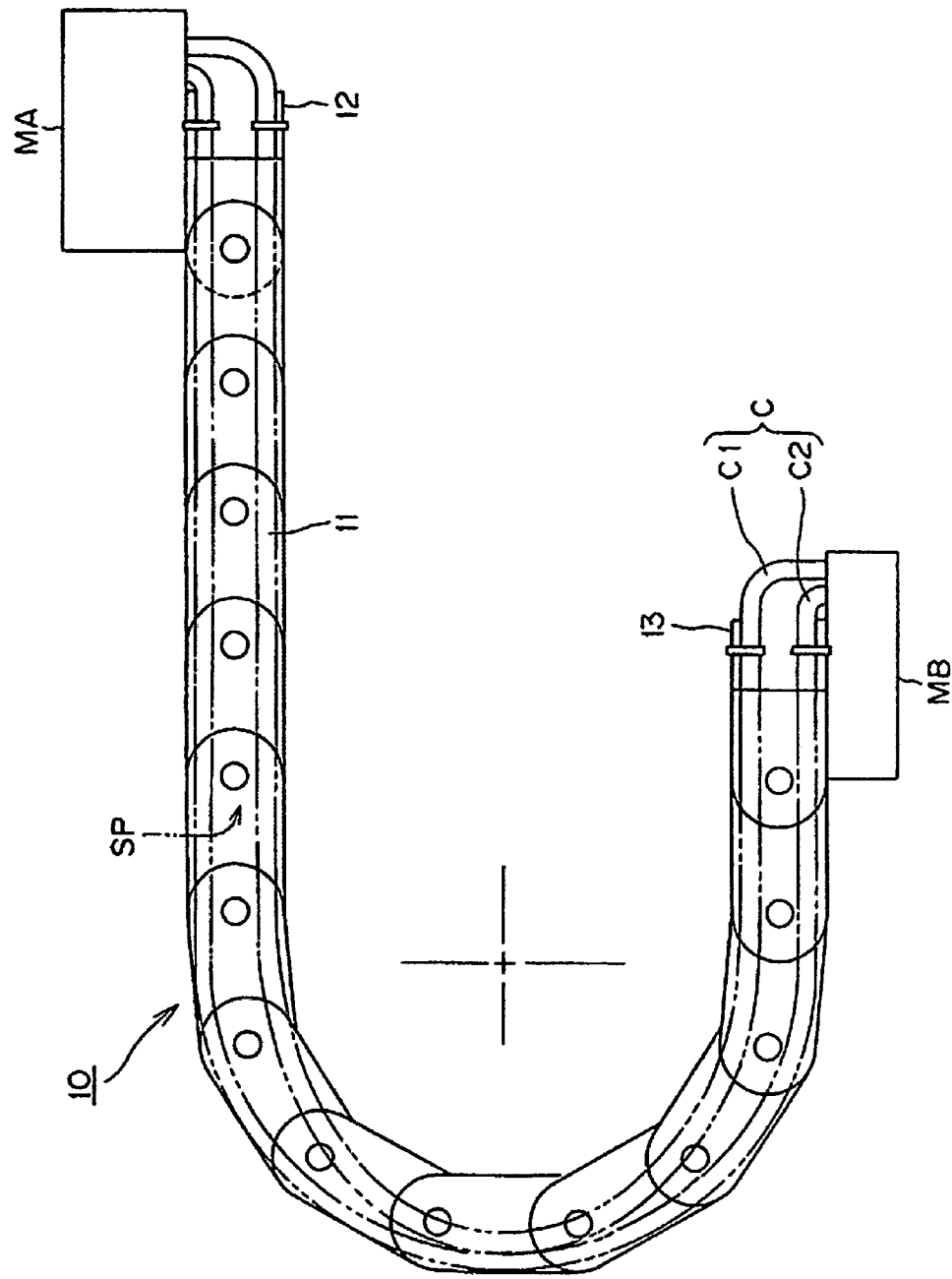
FIG. 6 is a side view of a conventional cable or the like clamp member.

The comb-tooth unit member 122 includes a tongue piece part 122f having a hook portion 122c provided at the tip of the engagement part 122a, the hook portion preventing the dropping-out of the engagement part at the time of the engaging installation to the comb-tooth installation side mechanism 121b. The tongue piece part 122f is elastically deformed and warped, at the time of inserting the comb-tooth unit member 122 to the comb-tooth installation slide mechanisms 121b, by slide contact of the hook part 122c with the lower surface of the T-shaped upper edges of the T-shaped sectional members, as shown in FIG. 5, to facilitate the insertion (refer to FIG. 5(b)), and also returned to the original state once inserted (refer to FIG. 5(c)) to prevent the dropping-out. The comb-tooth unit member 122 is slidably engaged with and installed to the comb-tooth unit receiving member 121 by the portion of the length corresponding to distance L shown in FIG. 5(c). Denoted at 121c in FIG. 3 is a slide portion allowing the slide of the comb-tooth unit member 122, and 121d is a mounting hole for fixing the comb-tooth unit receiving member 121 of the cable or the like clamp member to a stationary side or a moving side of an industrial machine.

In the comb-tooth unit member shown in FIG. 4, the engagement part 122a and the cable mounting part 122b have the same width. However, the width of the cable mounting part 122b is changed according to the thickness of a cable to be clamped, whereby the clamping thereof can be ensured more.

DESCRIPTION OF THE REFERENCE NUMERALS

C (C1, C2, C3, C4) Cable or the like
SP Cable Storage Space
MA Moving Part
MB Stationary Part
NB Bands
100 Cable or the like protection and guide device
110 Link frame body
111 Link plate
112 Bending inner circumferential-side connecting plate
113 Bending outer circumferential-side connecting plate
114 Connecting pin
115 Connecting pin hole
120 Cable or the like clamp member
121 Comb-tooth unit receiving member
121a Engaged portion
121b Comb-tooth installation slide mechanisms
121c Slide portion
121d Mounting hole
122 Comb-tooth unit member
122a Engagement part
122b Cable mounting part
122c Hook portion
122d Engagement protruding portion
122e Slide surface
122f Tongue piece part
122g Cable receiving curved face
122h Band fixing grooves The invention has been disclosed and described herein by way of example and those skilled in the art will readily recognize that changes may be made to the invention as described herein without departing from the spirit and the scope of the claimed invention.

The invention claimed is:

1. A cable clamp member to be attached to at least a fixed end part to be mounted on a stationary side and a moving end part to be mounted on a moving side of a cable protection and guide device for storing and protectively guiding cables, said cable clamp member comprising a comb-tooth unit member for clamping said cables and a comb-tooth unit receiving member with a comb-tooth installation slide mechanism for slidably engaging and installing said comb-tooth unit member according to the bending state of the cables, said comb-tooth unit member comprising an engagement part, said engagement part includes a tongue piece part and said tongue piece part having a hook portion.

2. A cable clamp member attached to a moving end part on a moving side of a cable protection and guide device comprising a comb-tooth member, a comb-tooth receiving member having a comb-tooth slide mechanism, said comb-tooth slide mechanism slidably engages said comb-tooth member, said comb-tooth member comprising an engagement part and a cable mounting part, said engagement part includes a flexible tongue piece having a hook portion, said flexible tongue piece flexes as it is inserted into said comb-tooth slide mechanism, and said hook portion of said flexible tongue piece and said cable mounting part slidably securing said comb-tooth member to said comb-tooth receiving member.

* * * * *